United States Patent
Mizuki et al.

(10) Patent No.: US 9,435,509 B2
(45) Date of Patent: Sep. 6, 2016

(54) LINEAR LIGHT SOURCE APPARATUS AND IMAGE READING APPARATUS

(71) Applicants: Stanley Electric Co., Ltd., Tokyo (JP); PFU LIMITED, Ishikawa (JP)

(72) Inventors: Yosuke Mizuki, Tokyo (JP); Keisuke Kimura, Ishikawa (JP); Masanari Takabatake, Ishikawa (JP); Sousuke Aono, Ishikawa (JP)

(73) Assignees: STANLEY ELECTRIC CO., LTD., Tokyo (JP); PFU LIMITED, Ishikawa (JP)

( * ) Notice: Subject to any disclaimer, the term of this patent is extended or adjusted under 35 U.S.C. 154(b) by 309 days.

(21) Appl. No.: 14/296,372

(22) Filed: Jun. 4, 2014

(65) Prior Publication Data
US 2014/0354867 A1 Dec. 4, 2014

(30) Foreign Application Priority Data
Jun. 4, 2013 (JP) ................................ 2013-117776

(51) Int. Cl.
*G02B 3/02* (2006.01)
*F21V 5/04* (2006.01)

(52) U.S. Cl.
CPC .. *F21V 5/04* (2013.01); *G02B 3/02* (2013.01)

(58) Field of Classification Search
CPC ...... F21V 5/04; G02B 3/02; H04N 1/02835; H04N 1/193; H04N 1/00525; H04N 2201/02462; H04N 2201/0436; H04N 2201/02456; H04N 1/00395; H04N 1/00798; H04N 1/00816; H04N 1/00896; H04N 1/02855
See application file for complete search history.

(56) References Cited

U.S. PATENT DOCUMENTS

| | | | | |
|---|---|---|---|---|
| 6,563,609 B1* | 5/2003 | Hattori | ..................... | G02B 3/02 358/474 |
| 7,548,352 B2* | 6/2009 | Sakurai | .............. | H04N 1/02815 250/552 |
| 2011/0286052 A1* | 11/2011 | Takabatake | ........ | H04N 1/00395 358/475 |
| 2011/0299135 A1* | 12/2011 | Takabatake | ........ | H04N 1/02835 358/474 |
| 2015/0070930 A1* | 3/2015 | Yamada | ..................... | F21V 5/00 362/606 |

FOREIGN PATENT DOCUMENTS

JP        2011-254330 A        12/2011

* cited by examiner

*Primary Examiner* — Aung S Moe
(74) *Attorney, Agent, or Firm* — Kenealy Vaidya LLP

(57) ABSTRACT

A linear light source apparatus is provided, being configured to convert light emitted from one light emitting element to light extended linearly, and output thus converted light. There is a lens that diffuses light flux within a predetermined region including the optical axis of the light emitting element, out of the light incident from the light emitting element, at a predetermined diffusion angle in the second direction (x-direction). The light is made to converge with respect to the first direction (y-direction). This converts the light from one light emitting element to light extended linearly and outputs the converted light. As for the second direction (x-direction), it is possible to make the light flux sparse in the predetermined region, and in the region outside thereof, the light flux is rendered to be dense. Therefore, a distribution of light quantity in the longitudinal direction (x-direction) is implemented by controlling the light flux density, upon employing the linear light source apparatus as a light source of the image reading apparatus.

13 Claims, 9 Drawing Sheets

LINEAR LIGHT SOURCE APPARATUS AND IMAGE READING APPARATUS

FIELD OF THE INVENTION

The present invention relates to a light source apparatus configured to emit linearly extended light, and in particular, it relates to a linear light source that is suitable for an overhead image reading apparatus configured to irradiate a source document (manuscript) with linear light from above, so as to read an image.

DESCRIPTION OF THE RELATED ART

As an image reading apparatus such as a copying machine, there is known a configuration that irradiates a source document placed on a contact glass with linear light, and receives the light reflected from the source document via a CCD (charge-coupled device), thereby reading the document. As a light source apparatus for illuminating linear light, there is known a system with a structure that arranges an LED on the edge of a light guiding plate, and guides the light from the LED along the light guiding plate so as to emit the light toward the document surface in a knurling shape with a predetermined pitch. Since in this kind of linear light source apparatus, apart of the light is lost in the light guiding plate, there is a problem that light efficiency is low. In addition, due to the knurling shape of the light guiding plate, unevenness in light quantity may occur in the light irradiated on the document surface, in accordance with the pitch of the knurling shape. Since the source document is illuminated with highly intensive light, there is also a problem that when high-power LED is used, heat outputted from the LED may increase a temperature of a member on which the LED is mounted and the light guiding plate. Moreover, the width of the light guiding plate is required to be equivalent to or larger than the width of the source document, and thus the size of the light source apparatus depends on the size of the source document. Accordingly, it is not possible to make the light source smaller than the document source size.

On the other hand, the Japanese unexamined patent application publication No. 2011-254330 (hereinafter, referred to as "patent document") discloses an overhead image reading apparatus that linearly extends the light from a point light source such as an LED by a collimator lens and a diffuser plate, for illuminating a source document from above, collects the light reflected upwardly from the source document by the lens, and performs reading by light receiving elements placed in one dimensional array. In this apparatus, the widths of the light source and the light receiving elements are made smaller than the document width, allowing the light source and the light receiving elements to be placed side by side above the document, and thereby downsizing the image reading apparatus.

DESCRIPTION OF THE RELATED ART

The patent document discloses that the light from the LED is converted to "straight-line light" by the collimator lens and further converted to "linear irradiation light in the direction parallel to the reading direction" by using the diffuser plate (paragraphs 0041, 0042, etc.), but it does not disclose specific shapes and optical characteristics of the collimator lens and the diffuser plate. The patent document further discloses that the light quantity distribution of the linear irradiation light may be configured in such a manner that it supplements the received light quantity distribution when light is received by the image reader (light receiving elements) (paragraphs 0016, 0053, 0061, etc.). However, it is not obviously described what kind of collimator lens and diffuser plate are able to achieve such light quantity distribution.

The present invention provides a linear light source that converts the light from a light emitting element to linearly extended light and outputs thus obtained linear light.

SUMMARY OF THE INVENTION

The present invention provides a linear light source apparatus having a light emitting element and a lens allowing light emitted from the light emitting element to converge with respect to the first direction and outputting flat light flux that extends linearly in the second direction being orthogonal to the first direction. The lens diffuses light flux in a predetermined region including an optical axis of the light emitting element, out of the light incident from the light emitting element, in the second direction at a predetermined diffusion angle. And the lens diffuses light flux in the region outside the predetermined region including the optical axis, in the second direction at a diffusion angle smaller than the diffusion angle of the light flux in the predetermined region including the optical axis. With this configuration, an emitted light quantity on the optical axis of the lens is made lower than the emitted light quantity in the region on outside the optical axis, with respect to the second direction.

According to the present invention, it is possible to provide a linear light source that converts the light from the light emitting element to linearly extended light, and outputs the light thus converted.

BRIEF DESCRIPTION OF THE DRAWINGS

FIG. 2A illustrates the light beams in the x-direction, and FIG. 2B illustrates light beams in the y-direction;

DESCRIPTION OF THE PREFERRED EMBODIMENT

The linear light source apparatus according to one of embodiments of the present invention will be explained with reference to the accompanying drawings. The present invention in not defined by the embodiment below.

Figure 1:
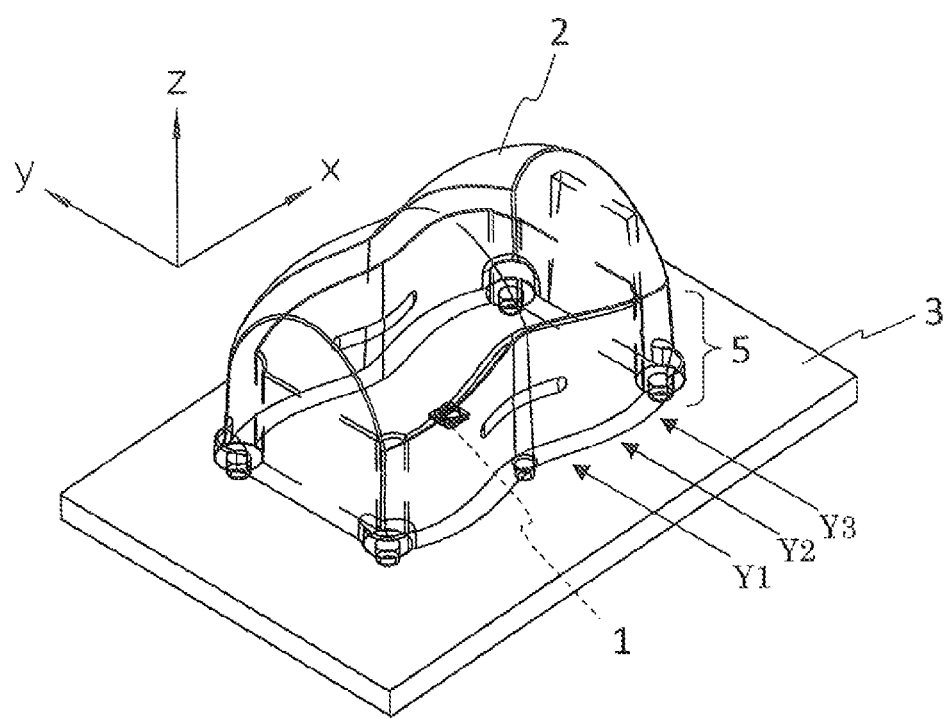
FIG. 1 is a perspective view illustrating the linear light source apparatus according to the present embodiment.

As illustrated in the perspective view of FIG. 1, the linear light source apparatus of the present embodiment is provided with the light emitting element 1 and the lens 2. As indicated by the light beams (light flux distribution) in FIG. 2A and FIG. 2B, the lens 2 allows the light 11 emitted from the light emitting element 1 to converge in the first direction (y-direction), and outputs the flat light flux 12 extending linearly in the second direction (x-direction) being orthogonal to the first direction.

Figure 2A:
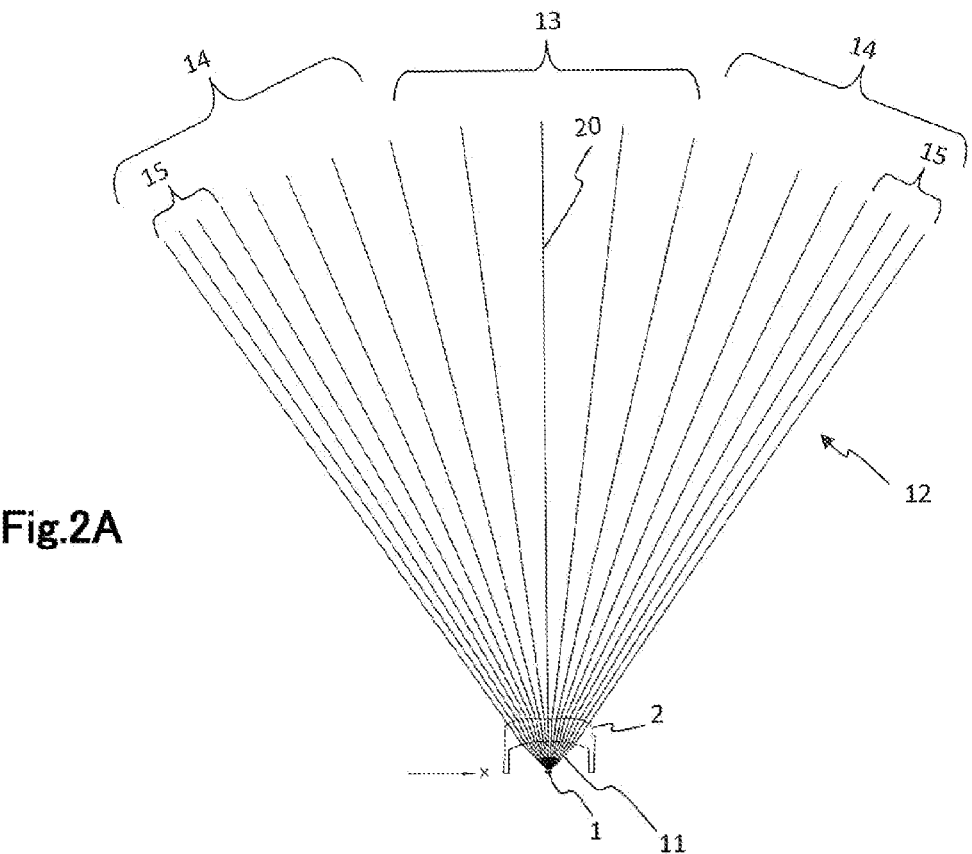
FIG. 2A and FIG. 2B illustrate light beams outputted from the linear light source apparatus according to the present embodiment.
Figure 2B:
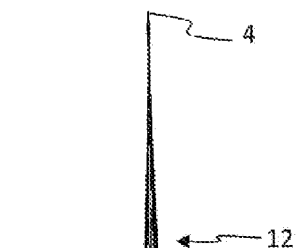

As shown in FIG. 2A, the light emitting element 1 emits the light, and the lens 2 is configured in such a manner that light flux within a predetermined region 13 including the optical axis 20 of the light emitting element 1, is made to diffuse in the second direction (x-direction) at a predetermined diffusion angle. The lens 2 is further configured in such a manner that the light flux within the region 14 on the outside the predetermined region 13 including the optical axis 20, is made to diffuse at a diffusion angle smaller than the diffusion angle of the light flux in the predetermined region 13. With this configuration, as indicated by the light quantity distribution in the second direction (x-direction) in FIG. 3A and FIG. 3B, the light quantity on the optical axis 20 of the lens 2 is lowered than the light quantity in the region on the outer side of the optical axis, with respect to the second direction (x-direction).

With the configuration as described above, it is possible to implement the linear light source of the present embodiment that converts the light from the light emitting element 1 to the light extending linearly and outputs thus converted light. As for the second direction (x-direction), the light flux distribution in the predetermined region 13 including the optical axis 20 is allowed to be sparse, whereas in the region 14 outside thereof, the light flux distribution is allowed to be dense. Therefore, upon employing the linear light source as a light source of an image reading apparatus, it is possible to achieve a light quantity distribution in linear longitudinal direction (x-direction), by controlling the density of the light flux.

As the light emitting element 1, it is preferable to employ an LED (light emitting diode), and in particular, an LED that outputs diffusion light is desirable. The number of the light emitting element 1 may be one, or at least two light emitting elements may be placed being adjacent to one another. In the present embodiment, the case where the number of the light emitting element 1 is one is taken as an example for the following explanation. Further in this example, plastic is employed as a material of the lens 2.

A specific shape of the lens 2 will be explained, as one example.

Figure 4A:
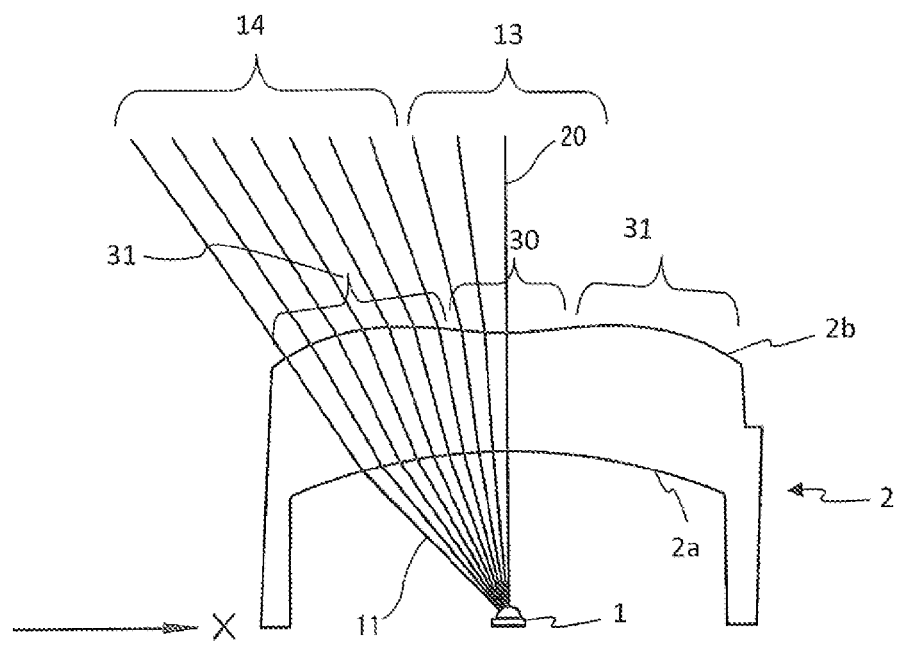
FIG. 4A illustrates the cross-sectional shape of the lens 2 and the light beams being parallel to the x-direction passing through the optical axis 20 according to the present embodiment.
Figure 4B:
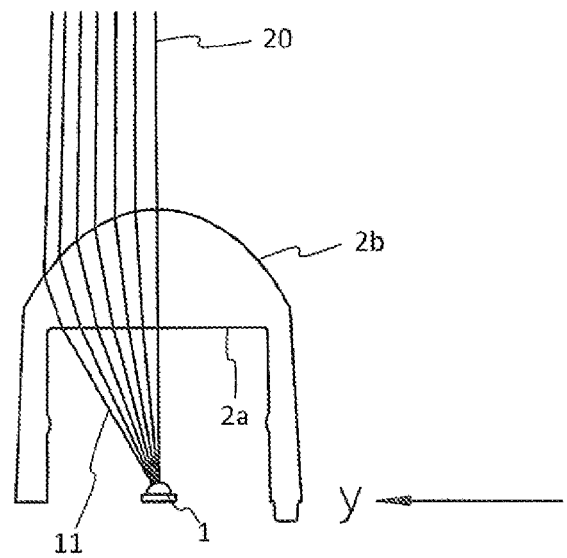
FIG. 4B illustrates the cross-sectional shape of the lens 2 and the light beams being parallel to the y-direction passing through the optical axis 20 according to the present embodiment.

FIG. 4A and FIG. 4B illustrate cross-sectional views of the lens 2 being parallel to the x-direction and the y-direction, respectively, both passing through the optical axis 20. The lens 2 has an incidence plane 2a where light from the light emitting element 1 enters, and an output plane 2b for outputting the light. The output plane 2b is provided with a concave shape 30 in the region centering on the optical axis 20 with respect to the second direction (x-direction). This concave shape 30, entirely or the central part thereof, may diffuse the light flux in the aforementioned predetermined region 13 at a predetermined diffusion angle in the x-direction.

The output plane 2b is also provided with convex shapes 31 respectively on both sides of the concave shape 30 with respect to the second direction (x-direction). As described above, since the convex shape 31 is arranged on both sides of the concave shape 30, it is possible to diffuse the light flux in the region 14 (FIG. 2), on the outside of the predetermined region 13 including the optical axis 20, at a diffusion angle that is smaller than the diffusion angle of the light flux in the predetermined region 13.

Figure 3A:
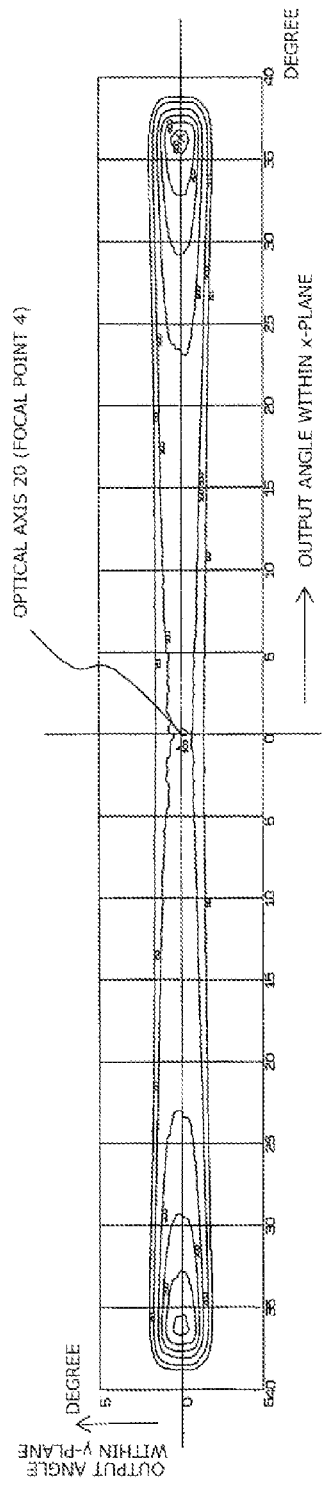
FIG. 3A illustrates a distribution of emitted light quantity in the distance of the focal point 4, as to each of the output angle directions in the x-plane and in the y-plane of the linear light source apparatus according to the present invention.
Figure 3C:
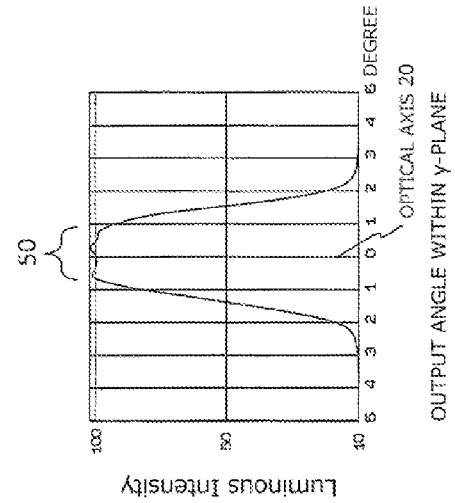
FIG. 3C is a graph indicating the ratio of the emitted light quantity as to each of the output angle directions within the y-plane.
Figure 3B:
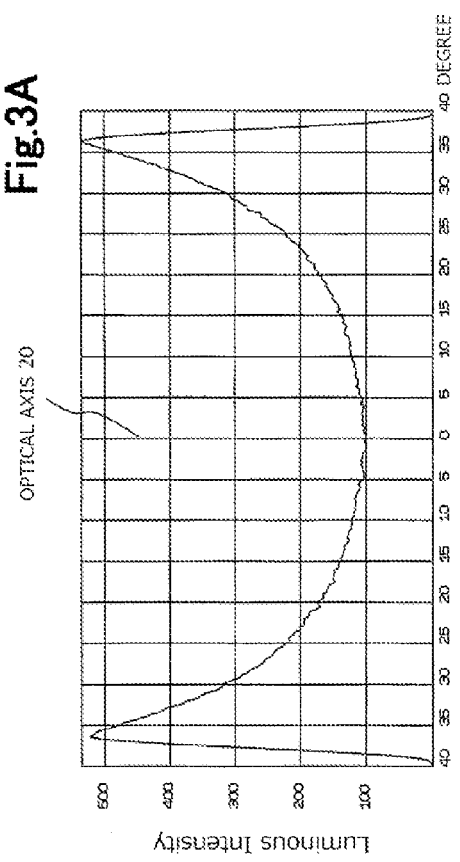
FIG. 3B is a graph indicating the ratio of the emitted light quantity, as to each of the output angle directions within the x-plane.

With the shape of the output plane 2b as described above, the light quantity on the optical axis 20 of the lens 2 is made lower than the light quantity in the outside region with respect to the second direction (x-direction), thereby generating a desired light quantity distribution as shown in FIG. 3A and FIG. 3B.

It is to be noted that the light flux in the outermost region 15 (FIG. 2A) within the outside region 14 may not be diffusion light, but parallel light or converging light. This configuration may further increase the light quantity in the outermost region 15 in the second direction (x-direction).

The output plane 2b has a convex shape with respect to the first direction (y-direction). This shape allows converging of the light 11 emitted from the light emitting element 1 in the first direction (y-direction).

The curvature of the convex shape of the output plane 2b in the first direction (y-direction) is maximized on the optical axis 20, and it becomes smaller with distance from the optical axis 20. By setting the curvature in the y-direction in such a manner as described above, it is possible to form the region 50 having homogeneous light quantity distribution in the y-direction, as indicated by the light quantity distribution in FIG. 3A and FIG. 3C.

On the other hand, as shown in FIG. 4A, the incidence plane 2a has a concave shape with respect to the second direction (x-direction). Configuring the incidence plane 2a as the concave shape in the second direction (x-direction) allows the light 11 emitted from the light emitting element 1, being diffused, to enter the incidence plane 2a at an angle that forms a normal line approximately, thereby achieving a travel of light almost in a straight line. Therefore, the light enters the output plane 2b, while substantially maintaining the diffusion angle in the light emitting element 1 with respect to the second direction (x-direction), allowing the output plane 2b to generate a distribution at a desired diffusion angle. With this configuration, the output plane 2b is only required to adjust the diffusion angle with the use of the light diffusion angle, so as to make the light flux sparse or dense, with respect to the second direction (x-direction).

Therefore, the curvature of the output plane 2b in the second direction (x-direction) may be made relatively small, enabling fine control. On the other hand, if the incidence plane 2a is flat or a convex shape, the light entering from the light emitting element 1 is made to converge once on the incidence plane 2a. Therefore, the output plane 2b is required to diffuse again the light that has converged once on the incidence plane 2a. This may enlarge the curvature of the output plane 2b and the position of the output plane 2b becomes higher, resulting in that fine control is not easily performed and designing the output plane 2b becomes difficult. Consequently, it is desirable that the incidence plane 2a has a concave shape with respect to the second direction (x-direction).

As shown in FIG. 4B, the shape of the incidence plane 2a in the cross section along the first direction (y-direction) is a straight line that is orthogonal to the optical axis. Since the incidence plane 2a is shaped as the straight line in the first direction (y-direction), the light 11 emitted from the light emitting element 1, being diffused, is made to converge to some extent in the first direction (y-direction), and allowed to enter the output plane 2b. Therefore, it is only required that the light already converging on the incidence plane 2a to some extent is made to further converge on the output plane 2b in the first direction (y-direction), and this may hold the curvature of the output plane 2b in the first direction (y-direction) to be relatively small, thereby downsizing the apparatus. On the other hand, in the case where the incidence plane 2a has a concave shape in the first direction (y-direction), the incident light on the incidence plane 2a does not converge, and thus the curvature of the output plane 2b has to be enlarged, resulting in that the apparatus may grow in size. In the case where the incidence plane 2a has a convex shape in the first direction (y-direction), the incident light is allowed to converge more, but if the lens shape in the first direction (y-direction) is tried to be maintained, there is no other choice but to reduce the lens diameter. Therefore, this may decrease the light quantity incident on the incidence plane 2a, and light efficiency may be deteriorated. Accordingly, it is desirable that the incidence plane 2a has a linear shape in the first direction (y-direction).

As illustrated in FIG. 1, the light emitting element 1 is mounted on a mounting plate 3. Legs 5 are connected to the outer periphery of the lens 2, so as to support the lens 2 on the mounting plate 3. Those leg 5 are fixed on the mounting plate 3 by thermal deposition, or the like. The legs support the lens 2 above the light emitting element 1, at a predetermined distance from the light emitting element 1. Such configuration as providing the legs 5 to the lens 2 allows a linear light source apparatus to be compact.

As shown in FIG. 1, the leg 5 may be provided in the form of a frame, on the entire periphery of the lens 2. With this configuration, the light emitting element 1 is surrounded by the frame-like leg 5 and the lens 2, thereby allowing the space where the light emitting element 1 is placed to be separated from the outer space. Accordingly, the light emitting element 1 becomes resistant to adhesion of dirt, and the like, from the outside, and it is possible to operate the light emitting element 1 stably for a long period of time, with enhancing its reliability.

The lens 2 and the leg 5 may be made of the same material and formed integrally. This configuration may reduce the number of components and simplify a manufacturing process, thereby further enhancing the reliability.

Figure 5A:
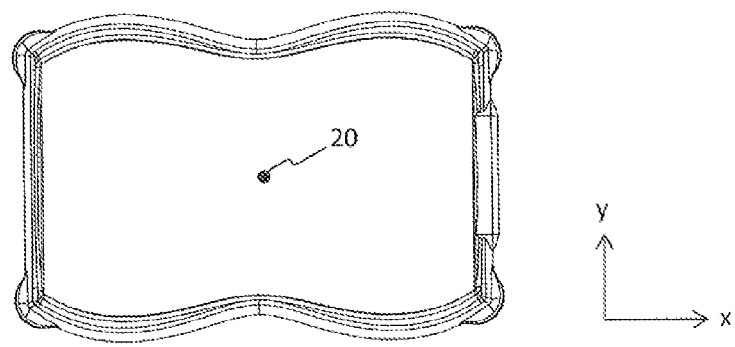
FIG. 5A is a top view.
Figure 5B:
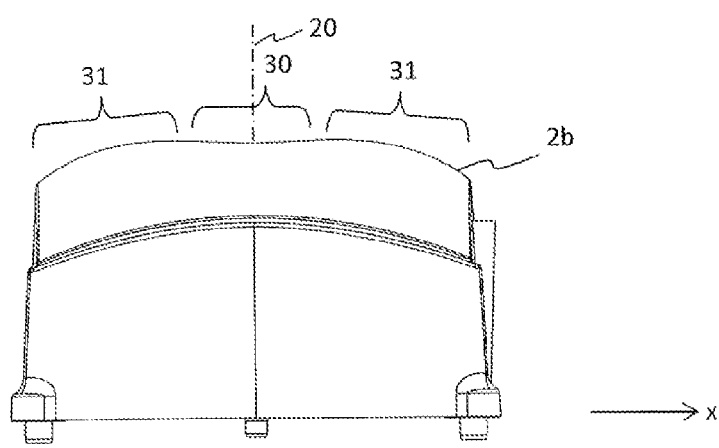
FIG. 5B is a side view.
Figure 5C:
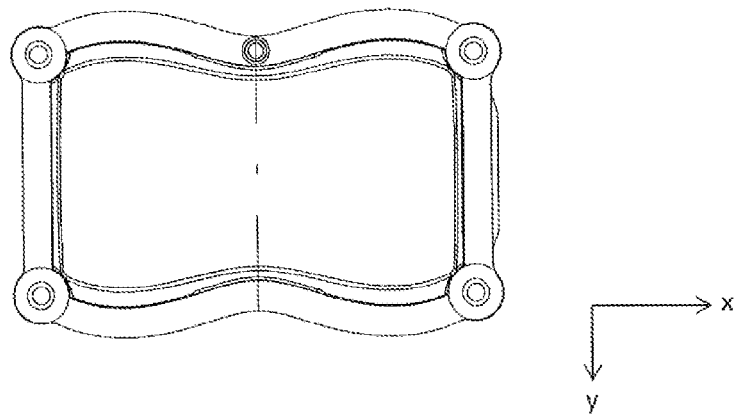
FIG. 5C is a bottom view, of the lens 2 according to the present embodiment according to the present embodiment.
Figure 6A:
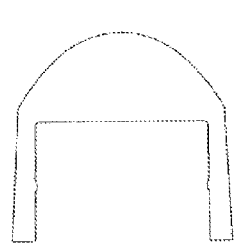
FIG. 6A is a cross sectional view of the lens 2 of the present embodiment, taken along the y-direction at the position Y1 indicated in FIG. 1.
Figure 6B:
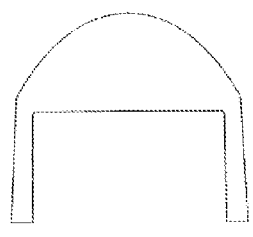
FIG. 6B is a cross sectional view of the lens 2, taken along the y-direction at the position Y2 indicated in FIG. 1.
Figure 6C:
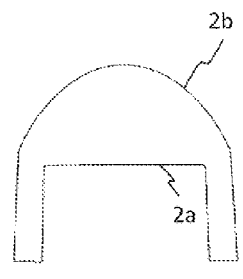
FIG. 6C is a cross sectional view of the lens 2, taken along the y-direction at the position Y3 indicated in FIG. 1.

With reference to FIG. 5A, FIG. 5B, FIG. 5C, and so on, a specific shape of the lens 2 will be explained in the following. FIG. 5A, FIG. 5B, and FIG. 5C are respectively, a top view, a side view, and a bottom view of one example of the lens 2 according to the present embodiment. FIG. 6A, FIG. 6B, and FIG. 6C are cross-sectional views, being parallel to the first direction (y-direction), respectively at the positions Y1, Y2, and Y3 of the lens 2, those positions being indicated in FIG. 1. As illustrated in FIG. 5B, the output plane 2b of the lens 2 in the present embodiment is provided with the concave shape 30 centering on the optical axis 20 with respect to the x-direction, and also provided with the convex shapes 31 on both sides of the concave shape 30.

Figure 7A:
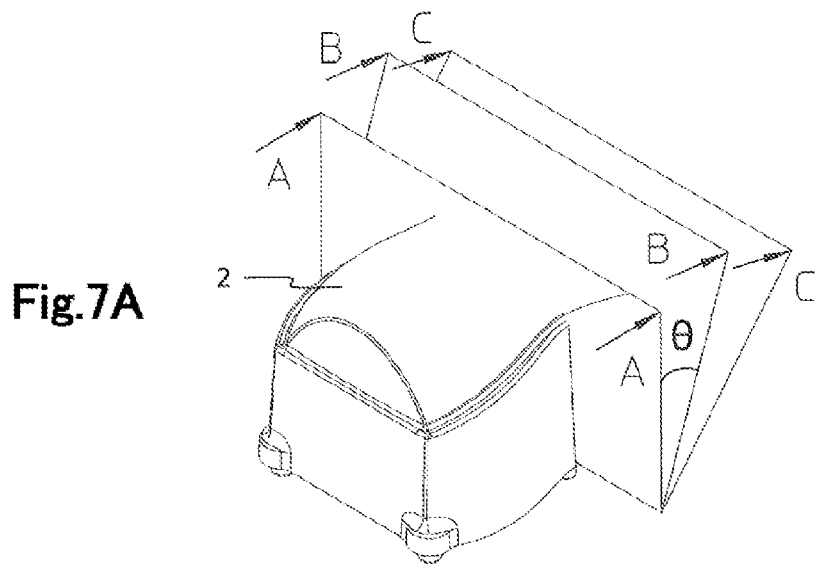
FIG. 7A illustrates planes A, B, and C of the lens 2 of the present embodiment, each different in the inclination angle θ from the optical axis in the x-direction.
Figures 7B, 7C, 7D:
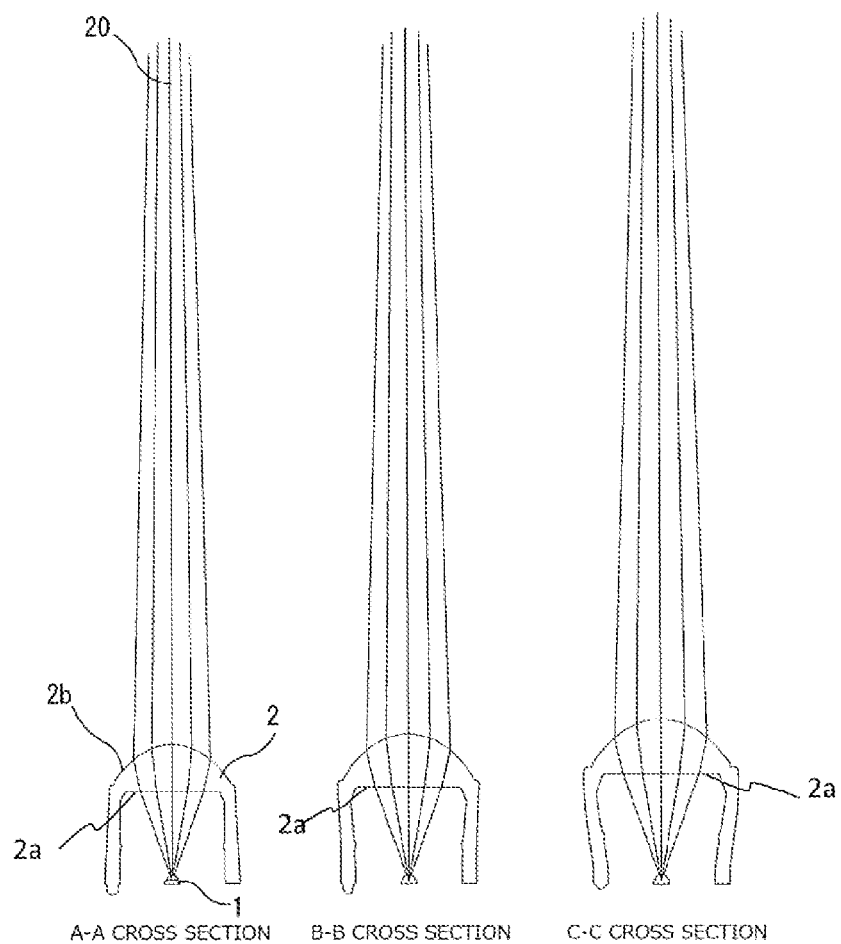
FIG. 7B illustrates the cross-sectional shape of the plane A including the optical axis and light beams.
FIG. 7C illustrates the cross-sectional shape of the plane B and light beams.
FIG. 7D illustrates the cross-sectional shape of the plane C and light beams.
Figure 8:
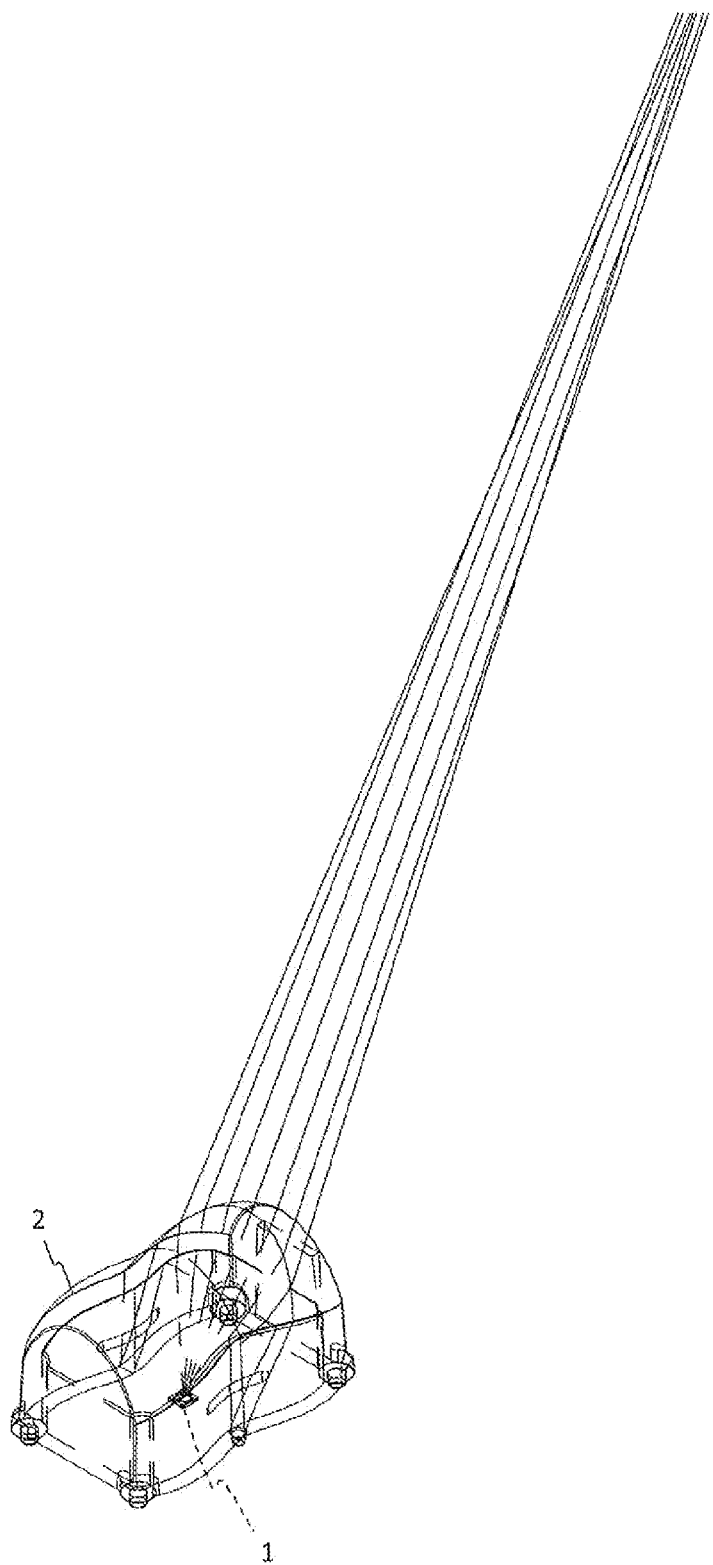
FIG. 8 illustrates light beams emitted at a certain inclination angle, from the light emitting element 1 of the linear light source apparatus according to the present embodiment.
Figure 9:
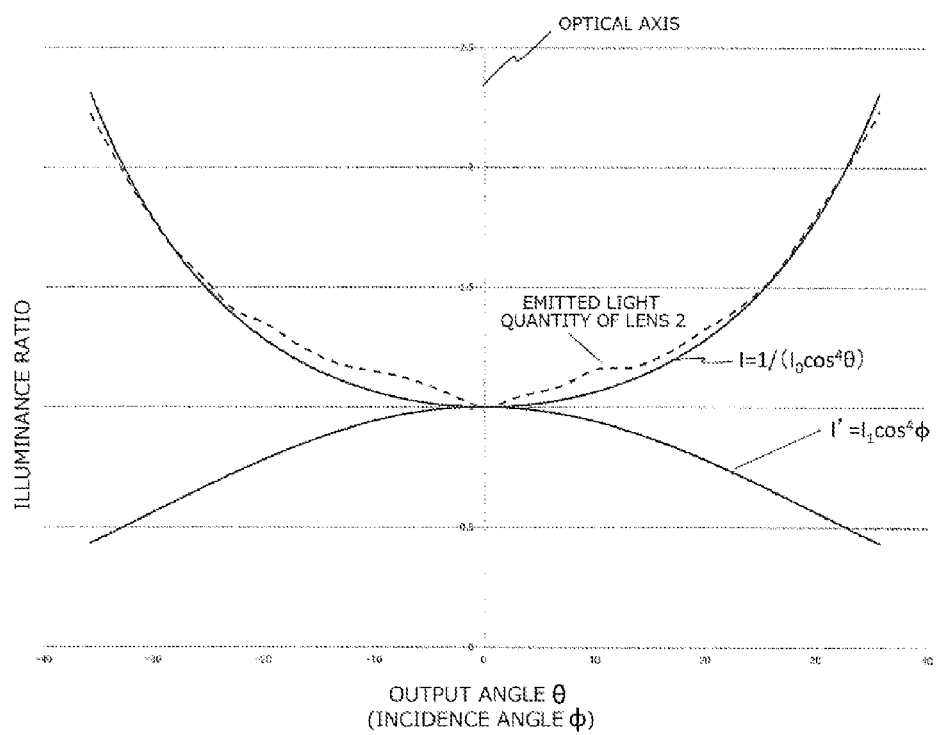
FIG. 9 is a graph showing the change in the emitted light quantity depending on the output angle θ of the linear light source apparatus according to the present embodiment.

As for the y-direction, the output plane 2b of the lens 2 takes the convex shape in any of the cross sections at the positions Y1, Y2, and Y3, as shown in FIG. 6A, FIG. 6B, and FIG. 6C. As seen from FIG. 6A, FIG. 6B, and FIG. 6C, as the cross section becomes distant from the optical axis 20 in the x-axis direction, the position of the incidence plane 2a becomes lower, that is, at the position Y3, in comparison to the position Y1 that is closer to the optical axis 20, the position of the incidence plane 2a is lower (i.e., it is closer to the light emitting element 1). The light is emitted from the light emitting element 1 in such a manner as being diffused, as shown in FIG. 7B, FIG. 7C, and FIG. 7D, and the configuration above aims to make the outgoing beams at the respective diffusing angles to converge at approximately the same distance from the lens 2. Specifically, the light beams emitted from the light emitting element 1 along the plane A (the plane including the optical axis 20) in FIG. 7A (FIG. 7B), the light beams emitted from the light emitting element 1 along the plane B inclined at approximately 15 degrees from the plane A (FIG. 7C), and the light beams emitted from the light emitting element 1 along the plane C inclined at approximately 30 degrees from the plane A (FIG. 7D), are diffused variously, because the distance from the light emitting element 1 to the lens 2 is different for each position. The lens 2 is designed so as to make those light beams above to converge at approximately the same distance from the lens 2 at each inclination angle, as shown in FIG. 8. With this configuration, a linear light flux is formed, being elongated in the x-direction and converging in the y-direction.

In the present embodiment, as one example, the shape of the lens 2 is designed in such a manner that the ratio between the emitted light quantity in the optical axis 20 direction ($\theta=0$) within the plane in the second direction (x-direction) (within a plane parallel to the x-direction including the optical axis 20: within the x plane), and the emitted light quantity at the maximum output angle ($\theta$=approximately 35 degrees) is around 1:5, and the emitted light quantity varies continuously from the optical axis 20 up to the maximum output angle, as shown in FIG. 3B. The lens 2 is also designed in such a manner that this continuous variation of the emitted light quantity substantially coincides with the curve expressed by $I=1/(I_0 \times \cos^4\theta)$, with respect to the output angle $\theta$ from the optical axis 20 within the x-plane. (It is to be noted here that I represents the emitted light quantity of the lens 2, and $I_0$ represents the emitted light quantity of the lens 2 when $\theta=0$.) The lens 2 is designed as described above due to the following reason: when the lens 2 is used in an image reading apparatus that will be described below, a light receiving apparatus employs a light collecting optical system, and therefore, the light quantity I' of the light entering the light receiving element changes according to the incidence angle $\phi$ to the light receiving apparatus, and a change curve thereof is expressed by $I'=I_1 \times \cos^4\phi$. (Here, it is to be noted that I' represents the light quantity incident on the light receiving element, $I_1$ represents the light quantity incident in the optical axis direction ($\phi=0$) of the light receiving apparatus, and $\phi$ represents the angle formed with the optical axis of the light receiving apparatus.) As discussed above, by controlling the emitted light quantity distribution of the linear light source apparatus, it is possible to supplement the characteristics of the light receiving apparatus.

The linear light source apparatus of the present embodiment described above may be employed in the image reading apparatus. The image reading apparatus of the present embodiment is provided with the linear light source apparatus configured to irradiate a source document (manuscript) with light flux extended linearly, and the light receiving apparatus. The light receiving apparatus allows the reflected light from the source document to converge and receives the light, thereby reading an image. By way of example, the light receiving apparatus includes a light-collecting optical system, and light receiving elements linearly arranged. Since the linear light source apparatus of the present embodiment is compact in size, the linear light source apparatus and the light receiving apparatus are arranged side by side along the second direction (x-direction) of the lens 2. On this occasion, the direction for arranging the light receiving elements of the light receiving apparatus is configured to be parallel to the second direction of the lens of the linear light source apparatus. With this configuration, the light-collecting optical system of the light receiving apparatus collects the reflected light of the linear light flux with which the linear light source apparatus illuminated the source document, and allows the light flux to enter the array of the light receiving elements for efficient receiving by those elements. It is to be noted here that the source document may be placed at any position in the vicinity of the focal point 4 of the linear light source apparatus, or on the focal point 4. This configuration allows irradiation of linear light on the source document, with a predetermined width in the first direction (y-direction) and long-extended in the second direction (x-direction).

One light receiving apparatus may be placed on one side of the linear light source apparatus, or alternatively, more than one light receiving apparatus may be placed respectively on both sides of the linear light source apparatuses.

According to the present embodiment, it is possible to implement a small-sized linear light source apparatus in which the lens 2 being compact in size diffuses the light emitted from one light emitting element in the second direction (x-direction), and allows the light to converge in the first direction (y-direction) to generate linear light flux.

What is claimed is:

1. A linear light source apparatus comprising,
a light emitting element, and
a lens configured to converge light being emitted from the light emitting element, with respect to a first direction, and output flat light flux being extended linearly in a second direction that is orthogonal to the first direction, wherein,
the lens diffuses light flux in a predetermined region including an optical axis of the light emitting element, out of the light incident from the light emitting element, in the second direction at a predetermined diffusion angle, and the lens diffuses light flux in a region outside the predetermined region including the optical axis, at a diffusion angle smaller than the diffusion angle of the light flux in the predetermined region including the optical axis, thereby reducing an emitted light quantity at the optical axis of the lens to be lower than the emitted light quantity in the region outside the predetermined region including the optical axis, with respect to the second direction.

2. The linear light source apparatus according to claim 1, wherein,
the lens comprises an incidence plane configured to allow the light from the light emitting element to enter, and an output plane configured to output the light, wherein,
the output plane has a region including the optical axis, the region taking a concave shape with respect to the second direction.

3. The linear light source apparatus according to claim 2, wherein,
the output plane takes a convex shape on each of both sides of the concave shape, with respect to the second direction.

4. The linear light source apparatus according to claim 2, wherein,
the output plane takes a convex shape with respect to the first direction.

5. The linear light source apparatus according to claim 4, wherein,
curvature of the convex shape with respect to the first direction of the output plane is the largest on the optical axis, and becomes smaller with distance from the optical axis.

6. The linear light source apparatus according to claim 2, wherein,
the incidence plane of the lens takes a concave shape with respect to the second direction.

7. The linear light source apparatus according to claim 2, wherein,
the incidence plane takes the shape of a straight line that is orthogonal to the optical axis, on a cross section being parallel to the first direction.

8. The linear light source apparatus according to claim 1, further comprising,
a mounting plate configured to mount the light emitting element, wherein,
legs are connected to an outer periphery of the lens, so as to support the lens on the mounting plate, the legs are fixed on the mounting plate, and the legs support the lens above the light emitting element, at a predetermined distance from the light emitting element.

9. The linear light source apparatus according to claim 8, wherein,
the legs are provided in the form of a frame on the entire periphery of the lens, thereby allowing the space where the light emitting element is placed to be separated from the outer space.

10. The linear light source apparatus according to claim 8, wherein,
the lens and the legs are made of the same material and formed integrally.

11. An image reading apparatus comprising a linear light source apparatus configured to irradiate a source document with light flux being extended linearly, and a light receiving apparatus configured to allow reflected light from the source document to converge and receive the light, wherein,
the linear light source apparatus is described in claim 1.

12. The image reading apparatus according to claim 11, wherein,
the light receiving apparatus comprises a light collecting system and light receiving elements in a linear array, and the light receiving apparatus and the linear light source apparatus are placed side by side, along the second direction of the lens, and
a direction of the array of the light receiving elements in the light receiving apparatus is parallel to the second direction of the lens of the linear light source apparatus.

13. The image reading apparatus according to claim 11, wherein,
the number of the light receiving apparatus is two, and the light receiving apparatuses are placed respectively on both sides of the linear light source apparatus along the second direction of the linear light source apparatus.

* * * * *